(12) United States Patent
Burrows et al.

(10) Patent No.: US 7,685,300 B2
(45) Date of Patent: Mar. 23, 2010

(54) METHOD FOR ACCESS BY SERVER-SIDE COMPONENTS USING UNSUPPORTED COMMUNICATION PROTOCOLS THROUGH PASSTHROUGH MECHANISM

(75) Inventors: Warwick Leslie Burrows, Austin, TX (US); Guenter Karioth, Waedenswil (CH); Birgit Monika Pfitzmann, Samstagern (CH); Matthias Schunter, Zürich (CH); Anthony Scott Moran, Santa Cruz, CA (US); Brian James Turner, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 1965 days.

(21) Appl. No.: 10/655,368

(22) Filed: Sep. 4, 2003

(65) Prior Publication Data

US 2005/0055434 A1    Mar. 10, 2005

(51) Int. Cl.
*G06F 15/16* (2006.01)
(52) U.S. Cl. ...................... 709/230; 709/203
(58) Field of Classification Search ............... 709/230
See application file for complete search history.

(56) References Cited

U.S. PATENT DOCUMENTS 6,092,196 A * 7/2000 Reiche ........................ 726/6
6,412,009 B1 * 6/2002 Erickson et al. ............. 709/228
6,446,204 B1 * 9/2002 Pang et al. ................... 713/153
7,281,139 B2 * 10/2007 Stewart ........................ 726/2

* cited by examiner

Primary Examiner—Yves Dalencourt
Assistant Examiner—Michael C Lai
(74) Attorney, Agent, or Firm—Hamilton & Terrile, LLP; Gary W. Hamilton

(57) ABSTRACT

A method is presented for obtaining information from a client for the benefit of a server using a particular communication protocol that the server does not implement. A primary server receives a client-generated request, and the primary server sends a first request to a secondary server as part of the processing of the client-generated request. While processing the first request, the secondary server determines a need for data obtainable from a client application that supports user interaction using a communication protocol for which the secondary server is not configured to implement. The secondary server sends a second request to the primary server for obtaining data that results from using the communication protocol. The secondary server subsequently receives the resulting data and continues to process the first request using the resulting data, after which the secondary server returns a response for the first request to the primary server.

1 Claim, 5 Drawing Sheets

US 7,685,300 B2

METHOD FOR ACCESS BY SERVER-SIDE COMPONENTS USING UNSUPPORTED COMMUNICATION PROTOCOLS THROUGH PASSTHROUGH MECHANISM

BACKGROUND OF THE INVENTION

1. Field of the Invention

The present invention relates to an improved data processing system and, in particular, to a method and apparatus for multicomputer data transferring. Still more particularly, the present invention provides a method and apparatus for multicomputer communication using assorted protocols.

2. Description of Related Art

E-commerce web sites and web applications perform transactions over computer networks on behalf of users. In an e-commerce web-based environment, computer systems often have authentication services as a form of electronic sentry gate while accessing a web site. A user must often pass through an authentication procedure to prove the user's identity to an appropriate level of certainty before obtaining access to most server-side resources. These authentication services may be implemented as a web server plug-in, a reverse proxy, or some other type of server-side component. To perform an authentication procedure, a protocol engine in a server-side component communicates directly with a client application using a protocol that is supported by the client application, such as HyperText Transport Protocol (HTTP), thereby often requiring client-focus, i.e. some type of control of the processing flow for the authentication process from the client-side perspective, which may often include user interaction through the client application.

However, in order to enhance security or in order to address other types of concerns, some server-side components may be restricted from executing or implementing certain protocols, particularly advanced protocols that are used by authentication services for user authentication and attribute exchange that require communication with web browsers or similar types of client applications.

Therefore, it would be advantageous to have a method and a system for enabling server-side components to access implementation of certain communication protocols within other server-side components that have the ability to achieve interaction with users through web browsers and similar types of client applications.

SUMMARY OF THE INVENTION

A method is presented for obtaining information from a client for the benefit of a server using a particular communication protocol that the server does not implement. A primary server receives a client-generated request, and the primary server sends a first request to a secondary server as part of the processing of the client-generated request. While processing the first request, the secondary server determines a need for data obtainable from a client application that supports user interaction using a communication protocol for which the secondary server is not configured to implement. The secondary server sends a second request to the primary server for obtaining data that results from using the communication protocol. The secondary server subsequently receives the resulting data and continues to process the first request using the resulting data, after which the secondary server returns a response for the first request to the primary server.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
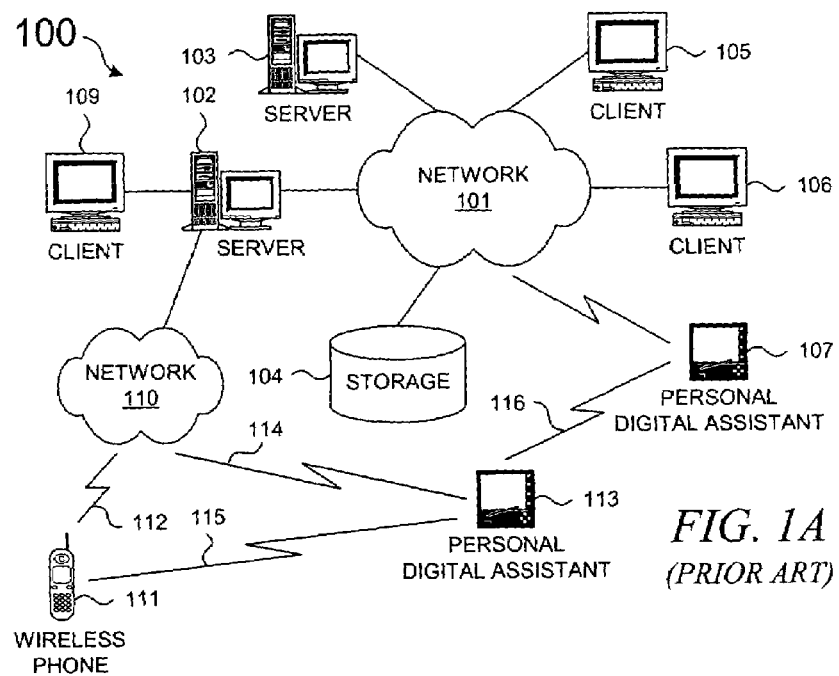
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
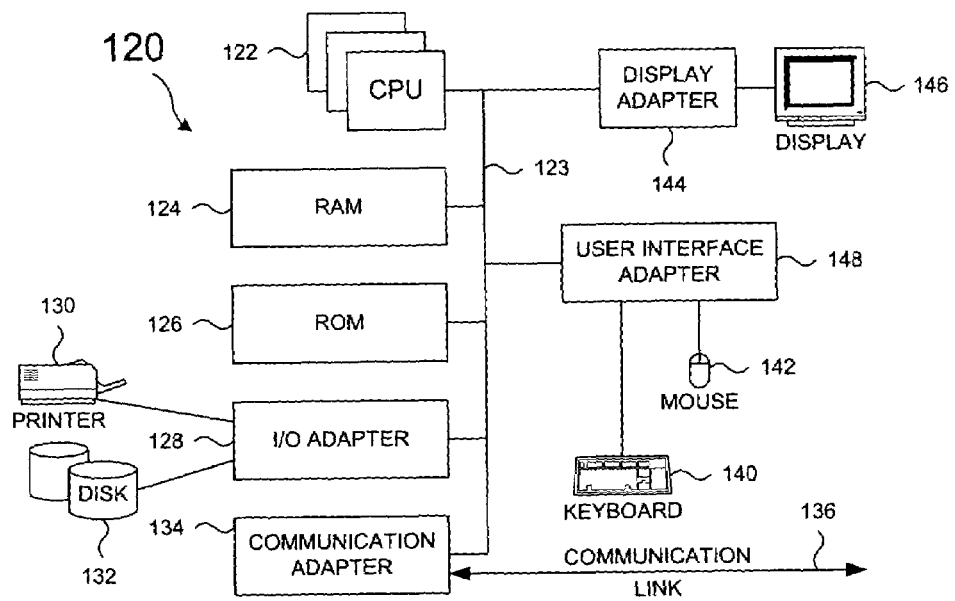
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to improved communication processing, particularly with respect to the use of protocols for authentication services. Prior to describing the improved processing in more detail, a typical authentication service is described.

The descriptions of the figures herein involve certain actions by either a client device or a user of the client device. One of ordinary skill in the art would understand that responses and/or requests to/from the client are sometimes initiated by a user and at other times are initiated automatically by a client, often on behalf of a user of the client. Hence, when a client or a user of a client is mentioned in the description of the figures, it should be understood that the terms "client" and "user" can be used interchangeably without significantly affecting the meaning of the described processes.

Figure 1C:
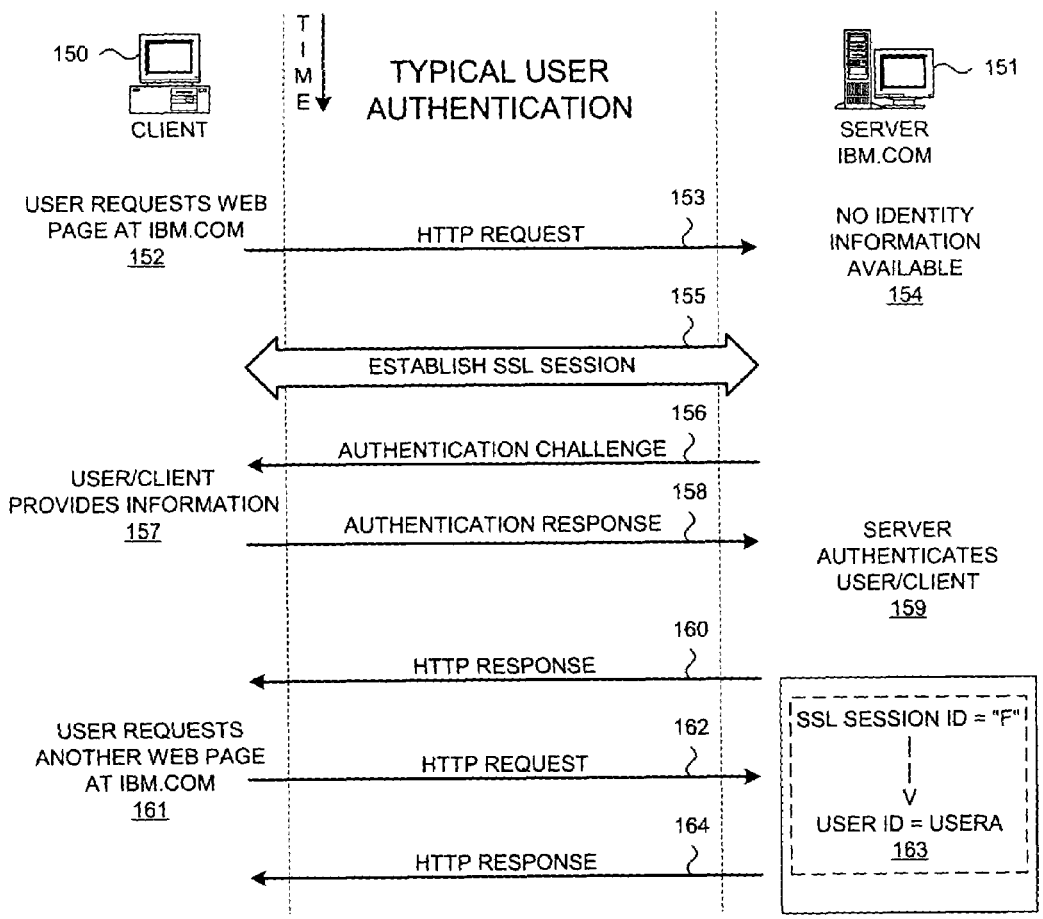
FIG. 1C depicts a data flow diagram that illustrates a typical authentication process that may be used when a client attempts to access a protected resource at a server.

With reference now to FIG. 1C, a data flow diagram illustrates a typical authentication process that may be used when a client attempts to access a protected resource at a server. As illustrated, the user at a client workstation 150 seeks access over a computer network to a protected resource on a server 151 through the user's web browser executing on the client workstation. A protected resource is a resource (an application, an object, a document, a page, a file, executable code, or other computational resource, communication-type resource, etc.) for which access is controlled or restricted. A protected resource is identified by a Uniform Resource Locator (URL), or more generally, a Uniform Resource Identifier (URI), that can only be accessed by an authenticated and authorized user. The computer network may be the Internet, an intranet, or other network, as shown in FIG. 1A or FIG. 1B, and the server may be a web application server (WAS), a server application, a servlet process, or the like.

The process is initiated when the user requests a server-side protected resource, such as a web page within the domain "ibm.com" (step 152). The terms "server-side" and "client-side" refer to actions or entities at a server or a client, respectively, within a networked environment. The web browser (or associated application or applet) generates an HTTP request (step 153) that is sent to the web server that is hosting the domain "ibm.com". The terms "request" and "response" should be understood to comprise data formatting that is appropriate for the transfer of information that is involved in a particular operation, such as messages, communication protocol information, or other associated information.

The server determines that it does not have an active session for the client (step 154), so the server initiates and completes the establishment of an SSL (Secure Sockets Layer) session between the server and the client (step 155), which entails multiple transfers of information between the client and the server. After an SSL session is established, subsequent communication messages are transferred within the SSL session; any secret information remains secure because of the encrypted communication messages within the SSL session.

However, the server needs to determine the identity of the user before allowing the user to have access to protected resources, so the server requires the user to perform an authentication process by sending the client some type of authentication challenge (step 156). The authentication challenge may be in various formats, such as an HTML form. The user then provides the requested or required information (step 157), such as a username or other type of user identifier along with an associated password or other form of secret information.

The authentication response information is sent to the server (step 158), at which point the server authenticates the user or client (step 159), e.g., by retrieving previously submitted registration information and matching the presented authentication information with the user's stored information. Assuming the authentication is successful, an active session is established for the authenticated user or client.

The server then retrieves the originally requested web page and sends an HTTP response message to the client (step 160), thereby fulfilling the user's original request for the protected resource. At that point, the user may request another page within "ibm.com" (step 161) by clicking a hypertext link within a browser window, and the browser sends another HTTP request message to the server (step 162). At that point, the server recognizes that the user has an active session (step 163), and the server sends the requested web page back to the client in another HTTP response message (step 164).

Figure 1D:
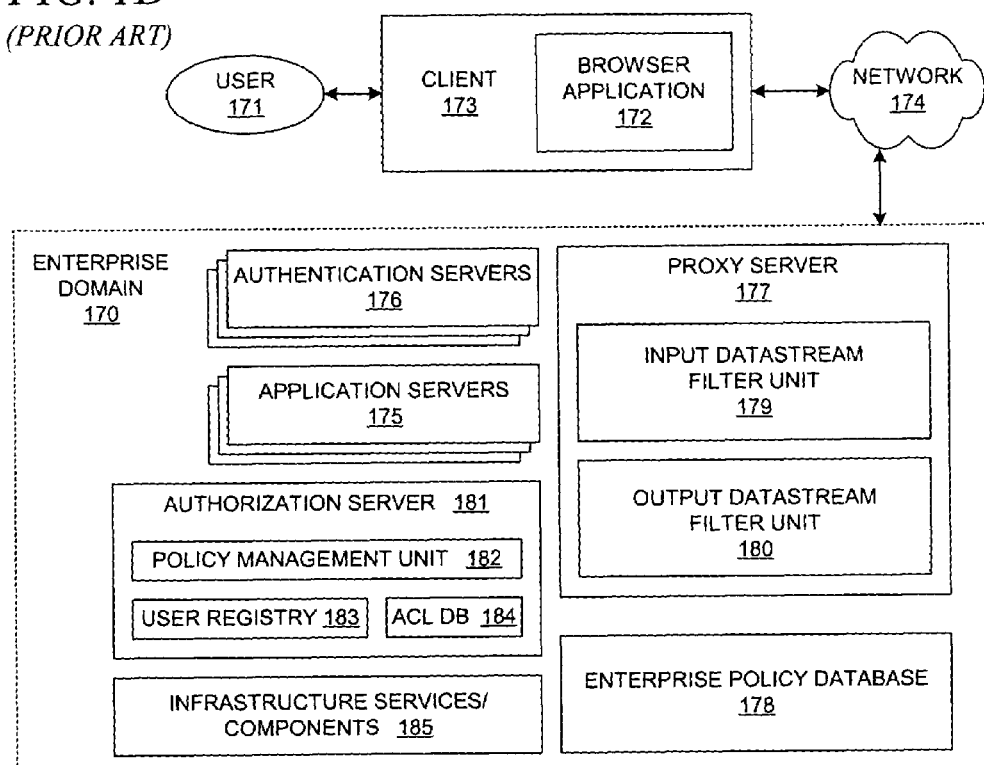
FIG. 1D depicts a block diagram that shows a typical data processing system for an enterprise domain that comprises multiple authentication servers.

With reference now to FIG. 1D, a block diagram depicts a typical data processing system for an enterprise domain that comprises multiple authentication servers. As in a typical corporate computing environment or an Internet-based computing environment, enterprise domain 170 hosts controlled resources that user 171 can access, e.g., by using browser application 172 on client device 173 through network 174. Application servers 175 support accessible resources through web-based applications or other types of applications, including legacy applications. Authentication servers 176 support various authentication mechanisms, such as username/password, X.509 certificates, or secure tokens.

Enterprise domain 170 supports multiple servers and various services and server-side infrastructure components that are able to communicate through a network, either network 174 or some other network that is not shown in the figure. Proxy server 177 performs a wide range of functions for enterprise domain 170. Proxy server 177 can be administratively configured through configuration files and enterprise policy database 178 to control the functionality of proxy server 177, e.g., caching web pages in order to mirror the content from an application server or filtering the incoming and outgoing datastreams through input datastream filter unit 179 and output datastream filter unit 180. Input datastream filter unit 179 may perform multiple checks on incoming requests while output datastream filter unit 180 may perform multiple checks on outgoing responses; each check may be performed in accordance with goals and conditions that are specified within various enterprise policies. The datastream filter units may comprise multiple components that are configured in accordance with various commercially available enterprise runtime environments.

Enterprise domain 170 comprises authorization server 181. Authorization policy management unit 182 at authorization server 181 manages information within user registry 183 and access control list (ACL) database 184. Policy management unit 182 determines whether users are authorized to access certain services that are provided by application servers 175 within domain 170 by checking policies against user requests for those services. Other infrastructure components or services 185 may be available for performing various functions on behalf of applications within enterprise domain 170.

The above-noted entities within enterprise domain 170 represent typical entities within many computing environments. As was shown with respect to FIG. 1C, web-based applications can utilize various means to prompt users to enter authentication information, often as a username/password combination within an HTML form. In the example that is shown in FIG. 1D, user 171 may be required to be authenticated before client 173 may have access to resources, after which a session is established for client 173 in a manner similar to that described above in FIG. 1C. In FIG. 1D, after receiving an incoming request from client 173, input datastream filter unit 179 may determine whether client 173 has already established a session; if not, an authentication service on authentication servers 176 can be invoked in order to authenticate user 171. If client 173 has already established a session, then additional checks may be performed on an incoming request prior to granting access to a controlled resource; the additional checks may be specified in an enterprise authentication policy.

Turning now to focus on the present invention, it was noted above that some servers may be restricted from executing or implementing certain communication protocols, particularly communication protocols that provide for user interaction through a client application. The present invention provides a solution to this problem by allowing a first server to request that another server execute an operation that uses a particular protocol that is not directly implemented by the first server. The present invention is described in more detail below with respect to the remaining figures.

Figure 2:
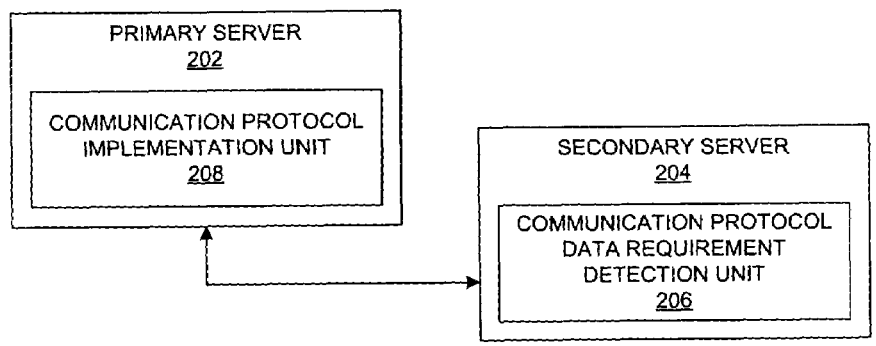
FIG. 2 depicts a block diagram that shows a pair of servers that have been configured to integrate functionality of a particular communication protocol into one of the servers in accordance with the present invention.

With reference now to FIG. 2, a block diagram depicts a pair of servers that have been configured to integrate functionality for a particular communication protocol into one of the servers in accordance with the present invention. Primary server 202 and secondary server 204 perform processing operations in order to fulfill a request that has been generated by a client application. A client-generated request is received by a server, such as primary server 202 or possibly some other server, and a series of operations are performed in order to fulfill the client request, i.e. to respond to the client request.

In the course of processing the client request, multiple server-side transactions may occur. Server 202 is considered to be a primary server with respect to server 204 in the sense that it is upstream in the flow of data or operations that occur in response to fulfillment of a client request; server 204 is considered to be a secondary server with respect to server 202 in the sense that it is downstream in the flow of data or operations that occur in response to fulfillment of a client request. Server 202 and server 204 may both generate multiple requests that are sent to multiple other servers while performing their portion of the fulfillment of a client request. An explanation of an embodiment of the present invention, though, is aided by a focus on a pair of servers, i.e. the primary and secondary servers, and the processing that is performed by those servers, although these servers may be grouped into a plurality of servers that complete multiple transactions while processing a single client-generated request.

Servers 202 and 204 are termed "servers" for providing the functionality of responding to received requests. Servers 202 and 204 may be implemented as infrastructure components, services, applications, software modules, hardware devices, or various other types of server-like components or server-side entities. In general, servers 202 and 204 perform some type of processing in response to a request for some form of resource that has been received; a received request may be in a variety of forms and formats, such as messages, remote procedure calls, remote method invocations, etc. Servers 202 and 204 may be implemented within a single domain, such as the server-side components that are shown in domain 170 in FIG. 1D, or within different domains; servers 202 and 204 are not required to be supported by a common operator.

In the present invention, secondary server 204 requires data that results, or is outputted from, an operation, a transaction, or other type of function that is accomplished through the use of a particular communication protocol. Secondary server 204 is not configured to implement the particular communication protocol that is required for performing the operation or the type of transaction from which secondary server 204 requires data. This configuration of non-implementation of the communication protocol may result from a variety of conditions that does not affect the scope of the present invention. For example, server 204 may simple not contain software or hardware that can directly implement the communication protocol. As another example, server 204 might contain software or hardware that could otherwise implement the communication protocol, but server 204 is configured in such a way that this functionality is not available; for example, the functionality may have been purposely disabled in some manner, or the functionality may be configurable such that it has been switched off at the direction of a system administrator or other type of user. While this may be problematic for certain applications in a typical data processing environment, the present invention presents a solution that overcomes this restriction as explained in more detail further below.

Secondary server 204 contains communication protocol data requirement detection unit 206 that determines that secondary server 204 requires data that is obtained through an operation using a particular communication protocol, e.g., an authentication operation. Communication protocol data requirement detection unit 206 may be implemented in a variety of hardware or software without affecting the scope of the present invention. As an example, communication protocol data requirement detection unit 206 may comprise software that is configured to require that the data must be obtained as input before further processing can be successfully completed. In another exemplary embodiment, communication protocol data requirement detection unit 206 may comprise a software module that detects an attempt by another software module to obtain the required data when it attempts to invoke a standard function that is typically associated with the particular communication protocol; e.g., the first software module may act as a configurable software switch that intercepts certain function calls.

Primary server 202 contains communication protocol implementation unit 208, which may be implemented in a variety of manners without affecting the scope of the present invention. As a first example, primary server 202 may contain a protocol engine/host that implements a particular communication protocol. As another example, primary server 202 is configured to implement a particular protocol by invoking, on behalf of a requesting entity like secondary server 204, functionality at another server-side component that contains a protocol engine/host.

The organization of elements that is shown in FIG. 2 can be contrasted with an organization of elements that is found in a typical data processing system, such as those that are shown in FIG. 1C and FIG. 1D. FIG. 1C shows a single server-side component, i.e. server 151, that implements an authentication protocol, whereas FIG. 2 shows a server-side component, i.e. secondary server 204, that relies upon another server-side component to implement a particular communication protocol. FIG. 1D shows an organization of multiple server-side components that interact to perform certain operations; for example, a server-side component, such as authentication server 176, implements communication protocols that are required by the authentication server to perform its authentication operations, yet other server-side components, such as proxy server 177, also participate in the transmission of messages for the implementation of the authentication protocol. In contrast, FIG. 2 shows that a server-side component, e.g., secondary server 204, can rely upon another server-side component, e.g., primary server 202, when it determines that it is not configured to implement a needed communication protocol, thereby requesting that another server-side component perform an operation using a particular protocol and then return the results.

Figure 3A:
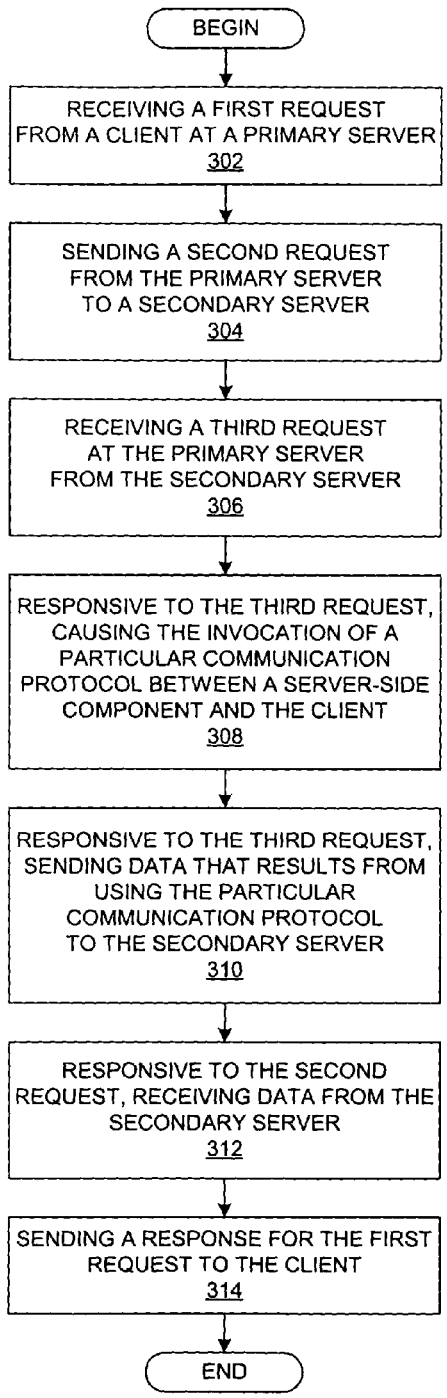
FIGS. 3A and 3B depict a pair of flowcharts that show a process by which a pair of servers interoperate to provide functionality for a particular communication protocol between the two servers in accordance with the present invention.
Figure 3B:
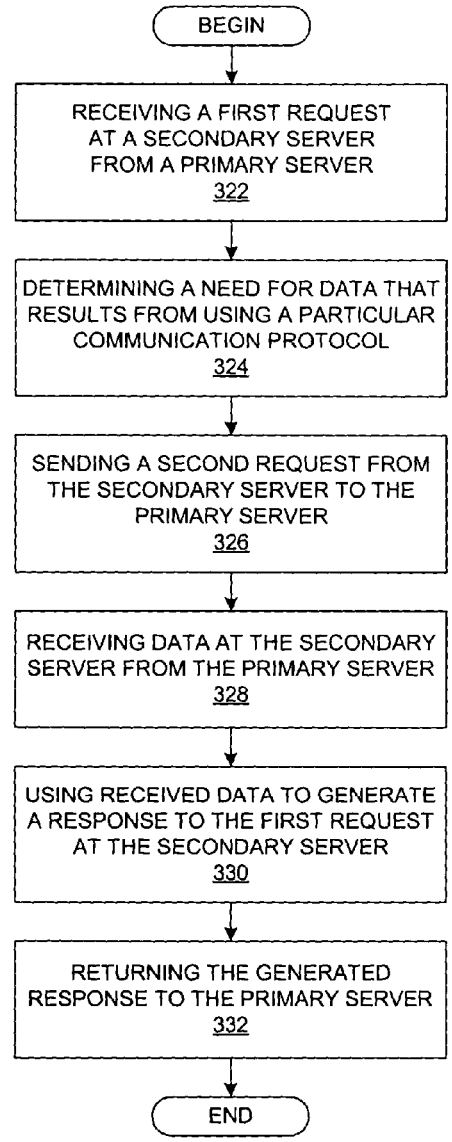

With reference now to FIGS. 3A and 3B, a pair of flowcharts depict a process by which a pair of servers interoperate to provide functionality for a particular communication protocol between the two servers in accordance with the present invention. FIG. 3A illustrates the process that may be performed by a primary server using the organization of server-side components that is shown in FIG. 2; FIG. 3B illustrates the process that may be performed by a secondary server using the organization of server-side components that is shown in FIG. 2.

Referring now to FIG. 3A, the process begins when a primary server receives a request from a client (step 302). To distinguish the request from the client from other requests that are introduced hereinbelow, the request from the client is described as a first request; as noted above, the request may be received in a variety of formats. As part of the process of fulfilling the request from the client, the primary server may generate many other requests to downstream servers that complete additional transactions as part of the fulfillment of the request from the client; at some point, the primary server sends a second request to another server, designated herein as a secondary server (step 304). It may be assumed that the sequence of requests and responses are processed asynchronously by the servers, and during the period of time between the sending of a request and the receipt of a corresponding response, the servers are able to perform other tasks, including processing other transactions; to provide an association between a request and its corresponding response, various types of transaction or session identifiers may be passed back and forth between the servers to assist in the management of the transactions.

At some subsequent point in time, the primary server receives a third request from the secondary server (step 306); the primary server determines that the third request is a command to cause the primary server to complete a particular operation using a particular communication protocol on behalf of the secondary server. Specifically, the secondary server is requesting the use of a particular communication protocol because the secondary server does not implement the requested communication protocol. Hence, the third request may include information such as the type of operation that is being requested, the particular communication protocol that is being requested, and any other associated information that directs the primary server to invoke the needed operation with the particular communication protocol. In response to receiving the third request, the primary server then causes the invocation of the operation with the particular communication on behalf of the secondary server (step 308). The primary server may directly perform the needed operation itself by executing the particular communication protocol, or the primary server may request that another server-side component perform the needed operation through the particular communication protocol by sending another request.

In either case, the needed operation is performed between a server-side component and the client that originally sent the first request. If the primary server performs the needed operation, then the primary server has the resulting data from the successful completion of the operation. If the primary server has requested that another server-side component perform the operation, then the primary server eventually receives a response to that request, and that response contains the resulting data from the successful completion of the operation. If an error occurs throughout any of the processing steps, then an error is eventually returned to the secondary server.

Thereafter, the primary server sends to the secondary server the data that results from the use of the particular communication protocol as requested by the secondary server in the third request (step 310). After the secondary server has performed additional processing using the resulting data that was returned to the secondary server, the primary server eventually receives a response to the second request that it had sent to the secondary server (step 312); the response to the second request contains data that is used by the primary server to formulate its response to the originally received request from the client. After computing that response, the primary server sends a response for the first request to the client, and the process is complete from the perspective of the primary server.

Referring now to FIG. 3B, the process begins when a secondary server receives a first request from a primary server (step 322); as noted above, the request may be received in a variety of forms. Since the flowchart in FIG. 3B shows the processing that occurs from the perspective of the secondary server, the requests within the description of the flowchart in FIG. 3B are described from the perspective of the secondary server.

While processing the received request or attempting to formulate a response to the received request, the secondary server determines that it has a need for data that results from performing an operation with a client using a particular communication protocol (step 324). In particular, the secondary server is attempting to formulate a response to the request that was received from the primary server, and the request from the primary server is assumed to have been generated by the primary server in response to an upstream request, possibly a request that was received by the primary server from a client. More specifically, the secondary server determines that it requires data that is obtainable from a client application that supports user interaction at the client; this data may be obtained through user interaction at the client. However, the secondary server determines that it is not configured to perform the needed operation with the client using the particular communication protocol. Hence, the secondary server sends a second request to the primary server (step 326); as noted above, the second request may include information such as the type of operation that is being requested, the particular communication protocol that is being requested, and any other associated information that directs the primary server to invoke the needed operation with the particular communication protocol.

At some subsequent point in time, the secondary server receives from the primary server the resulting data from the successful completion of the operation as requested within the second request (step 328); if an error occurs, then the secondary server may receive some type of error response that is processed in an appropriate manner. The secondary server then continues its processing to compute or formulate a response to the first request that was received from the primary server (step 330), after which the secondary server sends its response to the first request to the primary server (step 332), thereby concluding the processing of the first request from the perspective of the secondary server.

Figure 4:
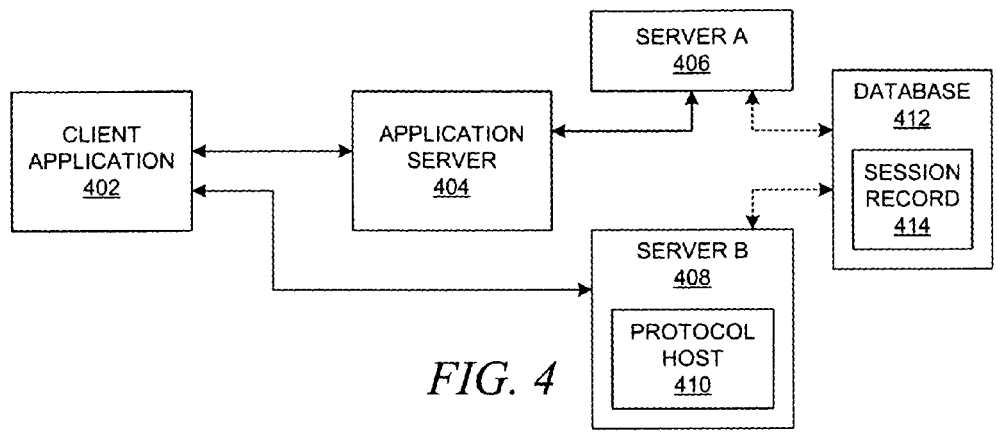
FIG. 4 depicts a block diagram that shows an embodiment of the present invention in which a first server is not configured to use a particular communication protocol yet is able to access, through the intermediate assistance of a second server, functionality for the communication protocol at a third server.
Figure 5:
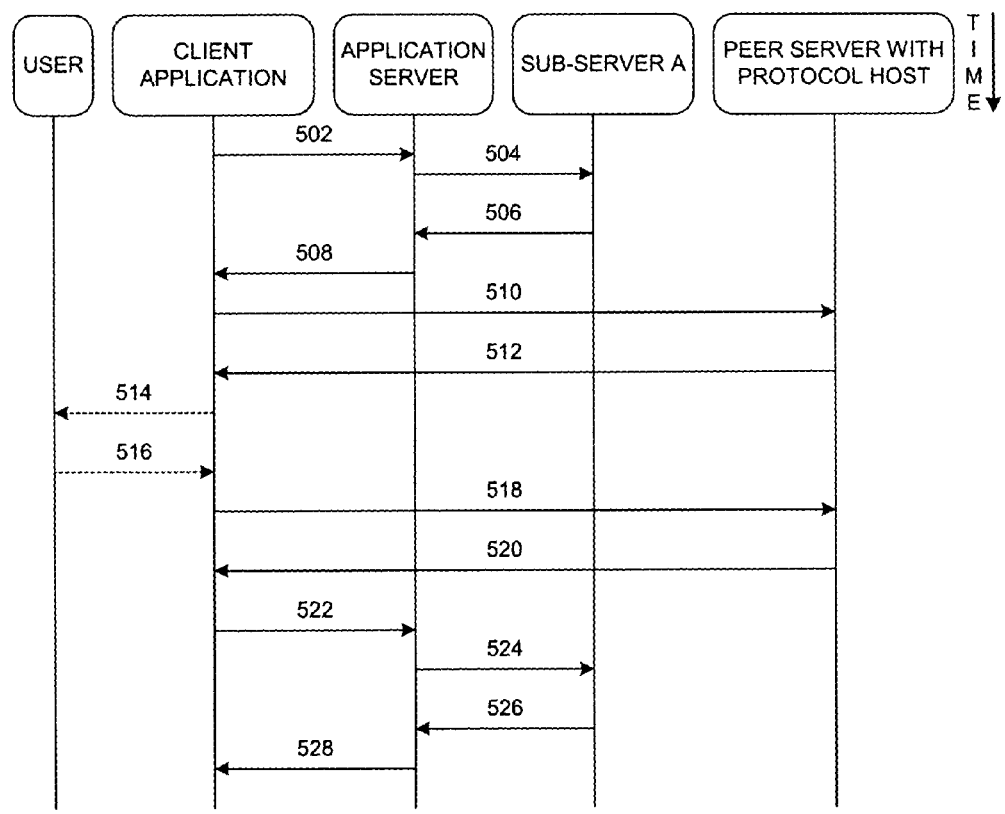
FIG. 5 depicts a dataflow diagram (or call graph) that shows the transmission of requests and responses between various servers and a client in accordance with an embodiment of the present invention.

With reference now to FIG. 4, a block diagram depicts an embodiment of the present invention in which a first server is not configured to use a particular communication protocol yet is able to access, through the intermediate assistance of a second server, functionality for the communication protocol at a third server. The organization of server-side components that is described with respect to FIG. 4 and FIG. 5 is intended as an extended example of the organization of server-side components that is described with respect to FIG. 2 and FIG. 3; the servers in FIG. 4 represent a set of possible server-side components. However, unlike the embodiment of the present invention that was described above with respect to FIG. 2 and FIG. 3, the embodiment of the present invention that is described with respect to FIG. 4 and FIG. 5 uses redirection through a client to invoke desired functionality in a server for interacting with the client. The processes that are described with respect to FIG. 4 and FIG. 5 may use a variety of communication protocols, although the communication protocol between the application server, the client, and one of the other servers supports a redirection operation. The process that is described with respect to FIG. 5 specifically illustrates the use of HTTP requests and responses, including HTTP redirection through a client, as described in more detail further below.

Referring now to FIG. 4, client application 402, e.g., a browser application, sends requests for resources to application server 404, which may operate within a domain behind a proxy server or other type of gateway. When application server 404 receives a request from client application 402, application server 404 may generate transactions to downstream servers by making requests to those servers, such as server 406. At some point in time, as described above, server 406 may require additional data from client application 402 before it can continue processing the request from application server 404, yet server 406 is configured in such a way that it cannot implement a communication protocol that is necessary for communicating with client application 402 to obtain the required data.

Hence, server 406 returns a request or command to application server 404 to obtain the required data using the indicated communication protocol, and application server 404 sends a request to server 408 via redirection through client application 402 to server 408. Protocol host 410 within server 408 then performs the required operation using the particular communication protocol, and server 408 returns a response to application server 404 via redirection through client application 402. Server 404 then forwards the required data in an appropriate format to server 406, which formulates and returns a response to the request that is previously received from application server 404. Server 406 and server 408 may pass data through an intermediate database 412 that contains session record 414, or data may be passed between the two servers in the redirection request and the redirection response to/from server 408, as explained in more detail with respect to FIG. 5.

With reference now to FIG. 5, a dataflow diagram (or call graph) depicts the transmission of requests and responses between various servers and a client in accordance with an embodiment of the present invention. The detailed example that is described with respect to FIG. 5 illustrates an embodiment of the present invention primarily using the HTTP communication protocol.

The process commences when a client application sends an HTTP request message for a resource to an application server (step 502); the HTTP request may identify a requested resource using a Uniform Resource Locator (URL), or more generally, a Uniform Resource Identifier (URI). In response to the initial request from the client application, the application server sends a subsequent request to a sub-server (shown as "sub-server A" in FIG. 5) to perform additional processing that assists the application server in computing a response to the client request (step 504); in this example, the sub-server may be termed a subservient server (or sub-server) based on its relationship to the application server, although the sub-server may respond to requests from many other servers, e.g., while acting as a web service. The application server may determine a need for invoking functionality at the sub-server based on the requested URI; the subsequent request to the sub-server may contain the originally requested URI from the client, although the subsequent request is not necessarily received as a message nor necessarily formatted as an HTTP Request message.

In a manner similar to that described above with respect to the other figures, the sub-server determines, while processing the subsequent request, that it has a need for required data that may be obtained from the client via a particular operation using a particular communication protocol for which the sub-server is not configured to implement; for example, the particular communication protocol may be a type of authentication protocol, or the particular communication protocol may be HTTP or SOAP (Simple Object Access Protocol). In response to this determination, the sub-server then sends a request to the application server to obtain the required data (step 506).

Since the sub-server is suspending its processing of the subsequent request, the sub-server may store a variety of state information that is associated with the current state of processing for the subsequent request. A unique session identifier may have been assigned to the subsequent request, either by the sub-server or the application server, and the state information associated with the subsequent request may be stored in association with its unique session identifier; for example, the state information may be stored in a database similar to database 412 as shown in FIG. 4. The session identifier would then be included in the request from the sub-server to the application server in the expectation that the session identifier would be subsequently returned to the sub-server from the application server along with the required data that is needed by the sub-server. Using the returned session identifier, the sub-server would be able to retrieve the state information that was previously saved during the suspension of the processing of the subsequent request from the application server.

When the application server receives the request from the sub-server, the application server obtains a redirect URI, and the application server sends an HTTP Redirect message that contains the redirect URI to the client application (step 508). Assuming that the request from the sub-server contains a session identifier, the application server would copy the session identifier into the HTTP Redirect message. The redirect URI may be obtained by the application server from the request from the sub-server; the sub-server may determine the redirect URI, possibly through a lookup operation in a database or through some form of information that is configured for the sub-server. In an alternative embodiment, the redirect URI is determined by the application server, possibly based on information obtained from the request from the sub-server, e.g., requests for different types of data or requests for different communication protocols may require different redirect URIs.

The client application receives the HTTP Redirect message and forwards the HTTP Redirect message as indicated by the redirect URI (step 510), which is received by a third server, termed a "peer server" in FIG. 5 due to its similarly subservient relationship with respect to the application server and its apparent peer relationship with the sub-server. The peer server is similar to server 408 that is shown in FIG. 4, and as described above, the peer server may support a web server, a web service, etc. After the peer server receives the HTTP Redirect message, the peer server initiates an operation with a particular communication protocol with respect to the client application (step 512); the IP address or other network address identifier of the client would be available from the HTTP Redirect message. The initiated operation may be preconfigured, or it may vary in accordance with information that has been received in the redirect URI. For example, the type of operation within the particular communication protocol may have been specified, or the type of data that is required by the sub-server may have been specified.

After receiving the message to participate in the initiated operation, the client application acts in accordance with the received message. In one embodiment, the peer server may perform an authentication operation with respect to the user of the client application, which may require user input. In any case, the client may interact with the user, if necessary. For example, the client application may present some information to the user of the client application (step 514), e.g., as a result of receiving an HTTP Put message from the peer server, and the user may input some information through a graphical user interface or through a hardware token (step 516). In another embodiment, the client application may be able to respond immediately to the request that was received from the peer server without further interaction with the user, e.g., possibly in accordance with the Simple Object Access Protocol (SOAP); alternatively, the client application may have already authenticated the user of the client application.

In any case, the client application responds to the request from the peer server (step 518), e.g., with an HTTP Post message. After receiving data from the client, the peer server may process the data. Assuming that a session identifier accompanied the HTTP Redirect message from the application server, the peer server may access a database to store the newly obtained data that was required by the sub-server, e.g., via a session record as shown in FIG. 4. Alternatively, the newly obtained data is bundled into the response that is redirected to the application server via the client.

Assuming that a session identifier accompanied the HTTP Redirect message from the application server, then the peer server may also retrieve from the database a redirect URI in order to return execution control for the client transaction back to the sub-server via the client and the application server; the redirect URI may have been stored into the database along with the state information for the session by the sub-server, in which case, the redirect URI may likely be the same as the URI that was originally received from the client by the application server. Alternatively, the original HTTP Redirect message that the peer server received may have contained a subsequent redirect URI that the peer server should use for sending the resulting data back to the application server. In any case, the peer server generates and sends an HTTP Redirect message (step 520).

The client application receives the HTTP Redirect message and forwards the HTTP Redirect message as indicated by the redirect URI to the application server (step 522). The application server retrieves the redirect URI and eventually calls or sends a request to the sub-server (step 524). Assuming that a session identifier has successfully made the round-trip from the sub-server to the peer server and back, then the sub-server also receives the session identifier from the application server. Depending on the manner in which the data from the particular communication protocol was handled by the peer server, the sub-server obtains the required data, e.g., from an intermediate database or from the redirected response, along with previously stored state information for the previously suspended session that is associated with the original transaction. The sub-server then computes some form of response using the data that has been acquired by the peer server on its behalf and returns its response to the application server (step 526). After using the response information from the sub-server, the application server computes its own response and returns a response to the client for the request that the application server originally received from the client (step 528), and the process is complete.

The advantages of the present invention should be apparent in view of the detailed description that is provided above. The present invention provides the ability to integrate certain protocols into server-side components, applications, infrastructure, etc., in which those protocols have not been implemented or to which access has been restricted from those server-side components. For example, authentication protocols may not be implemented within a server-side component, but the present invention allows the server-side component to obtain the functionality or the results of executing a restricted protocol as implemented within a different server-side component.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A computer-implemented method for generating data at a server, the method comprising processing logic to perform the steps of:

receiving at a secondary server from a primary server a first request that is based on a client-generated request from a client, wherein said secondary server is implemented with a web service;

while processing the first request at the secondary server, determining at the secondary server a need for data that is obtainable from a client application at the client using a HyperText Transport Protocol (HTTP) communication protocol for which the secondary server is not configured to implement; and in response to determining the need for data that results from using the HTTP communication protocol, sending from the secondary server to the primary server a second request, comprising information for a HTTP redirect message, for obtaining data from the client that results from using the HTTP communication protocol, wherein the primary server executes the HTTP communication protocol or delegates execution of the HTTP communication protocol to a third server to obtain the resulting data, wherein the resulting data is obtained through user interaction via the client application;

in response to sending the second request, receiving at the secondary server from the primary server the resulting data;

in response to receiving the resulting data, continuing processing that is associated with the first request using the resulting data; and returning from the secondary server to the primary server a response for the first request.

* * * * *